Patented Nov. 21, 1922.

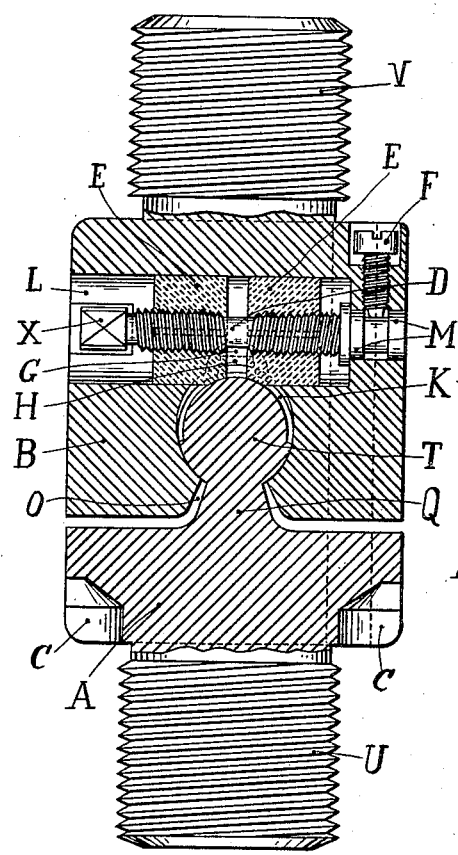
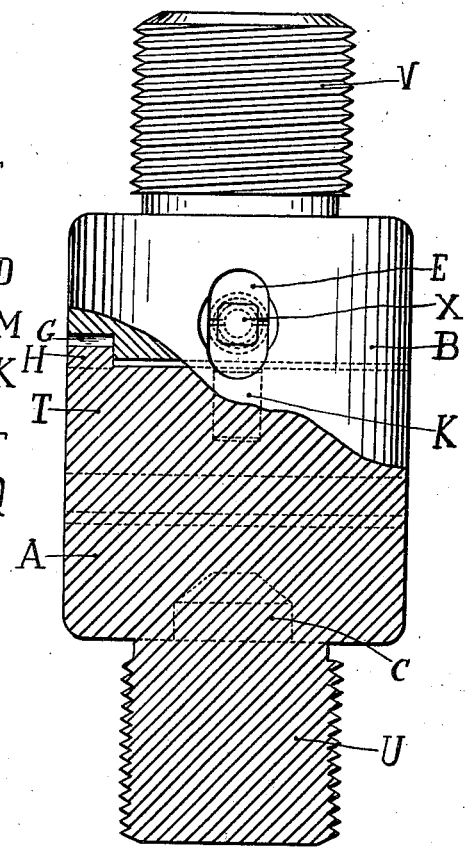

1,436,573

UNITED STATES PATENT OFFICE.

JOSEPH CHOPPINET, OF BRUSSELS, GUSTAVE GILLON, OF LOUVAIN, AND VICTOR DEFAYS, OF BRUSSELS, BELGIUM.

JOINT.

Application filed July 28, 1921. Serial No. 488,193.

*To all whom it may concern:*

Be it known that JOSEPH CHOPPINET, GUSTAVE GILLON, and VICTOR DEFAYS, subjects of the King of the Belgians, residing at Brussels, Louvain, and Brussels, Belgium, respectively, have invented certain new and useful Improvements in Joints, of which the following is a specification.

This invention relates to a joint for assembling rods or any other members and which is more particularly suitable for assembling the rods of drilling apparatus.

It is more especially in the latter apparatus that the joints should satisfy the strictest conditions, more especially with regard to the facility and rapidity of the assemblage and dismantling of the members, to the accuracy of the relative position of the members to be assembled and maintenance of the said position even when the assemblage is subjected to a tensile or torsional stress, to the possibility of resisting considerable tensile and torsional stresses, to the necessity of reducing the dimensions of the assemblage to a minimum and to the necessity of taking a certain inclination under the influence of efforts exceeding a predetermined value.

The joint according to the present invention answers completely the above conditions.

It belongs to the type of joints comprising two main parts, one of which is provided with a collar having a cylindrical head and the other with a cylindrical recess, into which the said head engages.

According to the present invention, the member containing the recess is provided with a locking device which has for its effect, not only to lock the cylindrical head in the longitudinal direction, but also to press it against the walls of the recess, and on the other hand, the opening of the said recess is wider than the neck carrying the cylindrical head in order to allow the latter a slight rotation around its axis, under the action of any effort sufficient to overcome the friction due to the pressure exerted by the locking device.

A stop which is preferably fixed to the cylindrical head, allows of determining exactly the longitudinal position of the latter inside its recess. A locking device which comes into action when the head occupies the desired position inside its recess comprises two sliding nuts mounted on each side of the said recess and connected by a double screw, in such a manner as to come into engagement with a transverse groove cut in the cylindrical head. The latter is thus locked in the longitudinal direction. The assemblage however possesses the desired flexibility in the transverse direction because the head can slightly rotate in the recess if the effort which solicits it is sufficient for overcoming the adjustable resistance which is opposed by the pressure of the nuts.

In the accompanying drawings illustrating by way of example one mode of construction of a joint according to the present invention, Fig. 1 is a vertical section, and Fig. 2 is an elevation with partial section along a plane perpendicular to that of Fig. 1.

A and B are the two parts of the joint which are rigidly connected, by means of connections U and V for instance, to the rods or other members to be assembled. The member A is provided with a head T of cylindrical shape which fits transversely in the member B, which to this end is provided with a cylindrical recess, the opening O of which is narrower than the diameter of the head T, and surrounds the neck Q connecting the head to the body of the member A. The head T is provided with a projection H which, when the members are assembled, slides in a groove G formed at the bottom of the cylindrical recess of the member B and abuts against the bottom of the said groove, thus determining the relative position of the members A and B, in which the connections U, V are exactly in a line with each other.

A second recess L of non-circular section is provided in the member B, cutting the top of the recess intended to receive the head T of the member A. The said recess L is adapted to receive two nuts E, E which are screwthreaded in opposite directions and are traversed by a double screw D the longitudinal displacement of which is prevented by a screw F, the end of which engages between two collars M, M integral with the screw D.

It follows from the said arrangement that if the screw D is rotated, for instance by means of a key fitted on its square bearing X, the nuts E will come nearer or move apart from each other by sliding in their recess L.

When the head T has been driven into the cylindrical recess of the member B until the projection H bears against the bottom of the groove G, a transverse groove K, which is provided around the head T comes exactly opposite the nuts E.

Therefore, if the screw D is then rotated in order to bring the nuts E nearer to each other, these nuts being preferably provided with bearing surfaces intended to follow exactly the curvature of the bottom of the groove K, they engage in the said groove and exert a pressure which will apply the head T firmly against the lower part of its recess, whilst the side walls of the groove K will be opposed to any longitudinal displacement of the head T.

As long as the screw D will remain in the said position, the members A and B cannot be separated.

In order to give to the assemblage the flexibility which is indispensable, the opening O of the member B is made slightly wider than the neck Q of the member A, thereby enabling the latter to effect a rotation through a few degrees around the axis of the head A under the action of an effort which is sufficient for overcoming the friction due to the pressure exerted on the nuts E.

C C are conical recesses provided in the member A and allowing of exactly positioning the assemblage relatively to a stand on which they may be fitted.

It is easy to see that the described joint fulfils all the conditions mentioned at the beginning of the present description. It is of simple and strong construction and of an easy and rapid operation, and has the advantage of allowing an exact repositioning of the various members. The play which exists between the walls of the opening O and the neck Q, imparts to the joint the flexibility which is required for the assemblage of rods of drilling apparatus, which have to be lowered and rotated in drilling tubes, the length of which is often very considerable, and the axis of which deviates more or less from the vertical line. The joints may be assembled to the rods in such a manner that the axis of the cylindrical heads of the successive joints shall be alternately placed at 90° from each other.

It will lastly be noticed that any tensile stress exerted on the member A along the axis of the connection U, will have for its effect better to apply the head T against its seat and may, therefore, contribute to maintain the relative position of the members.

We claim:—

1. A joint for assembling rods, comprising a pair of members, one member having a head thereon adapted to fit in a recess in the other member, a pair of locking members carried by the recessed member, and means for operating said locking members toward each other for engaging and locking the head in the recessed member.

2. A joint for assembling rods and the like comprising two members, a cylindrical head, a neck connecting said head to one of said members, the other member having a cylindrical recess adapted to receive said head and provided with a longitudinal opening, said opening being wider than said neck and narrower than said head, and adjustable means in the last mentioned member for pressing said head against the walls of said recess.

3. A joint for assembling rods, comprising a pair of members, one member having a head thereon adapted to fit in a recess in the other member, a stop formed on the head engaging the other member for centering the members respectively, a pair of locking members, and means for operating the locking members, whereby in the movement of the members toward each other they will engage and lock the head in the recess.

4. A joint for assembling rods and the like comprising two members, a cylindrical head, a neck connecting said head to one of said members, the other member having a cylindrical recess adapted to receive said head, two nuts slidably mounted in the last mentioned member, said nuts being adapted to engage said head on opposite sides thereof, and a double screw for moving said nuts towards and away from said head.

5. A joint for assembling rods and the like comprising two members, a cylindrical head on one of said members adapted to fit in a cylindrical recess in the other member, and means for locking said head against longitudinal movement, also serving to frictionally hold said head against rocking movement.

6. A joint for assembling rods and the like comprising two members, a cylindrical head, a neck connecting said head to one of said members, said head being adapted to fit in a recess in the other member and said neck adapted to extend through a longitudinal opening in said recess, a stop on said head and a co-operating stop on the wall of said recess, and means including a pair of nuts and a double screw for pressing said cylinder against the wall of said recess.

7. A joint for assembling rods and the like comprising two members, a cylindrical head on one of said members adapted to fit in a cylindrical recess in the other member, said head being connected to the first mentioned member by a neck adapted to extend through an opening in the second mentioned member, said nuts having bearing surfaces adapted to be pressed against said head, said head having a transverse groove adapted to receive said bearing surfaces, and a double screw for operating said nuts.

In testimony whereof we have affixed our signatures.

JOSEPH CHOPPINET.
G. GILLON.
VICTOR DEFAYS.

Witnesses:
M. C. HORAK,
EMIL VON WARSEELE.